United States Patent [19]
Van Laethem et al.

[11] 3,930,452
[45] Jan. 6, 1976

[54] IMPACT RESISTANT PANELS

[75] Inventors: Robert Van Laethem, Loverval; Pol Baudin, Ransart; Marcel De Boel, Chatelineau, all of Belgium

[73] Assignee: Glaverbel-Mecaniver S.A., Watermael-Boitsfort, Belgium

[22] Filed: Sept. 19, 1973

[21] Appl. No.: 398,783

[30] Foreign Application Priority Data
Sept. 29, 1972 Luxemburg.......................... 66196

[52] U.S. Cl. ................ 109/80; 89/36 A; 109/49.5; 428/339
[51] Int. Cl.² ........................................ F41H 5/04
[58] Field of Search .......... 109/78, 80, 82, 84, 49.5, 109/58.5; 161/404; 89/36 A

[56] References Cited
UNITED STATES PATENTS

| | | | |
|---|---|---|---|
| 2,991,209 | 7/1961 | Worrall | 161/404 X |
| 3,135,645 | 6/1964 | Burkley et al. | 161/404 X |
| 3,324,768 | 6/1967 | Eichelberger | 109/84 X |
| 3,380,406 | 4/1968 | Gosnell | 109/80 |
| 3,671,370 | 6/1972 | Littell | 109/49.5 X |
| 3,702,593 | 11/1972 | Fine | 89/36 A |

*Primary Examiner*—Dennis L. Taylor
*Attorney, Agent, or Firm*—Spencer & Kaye

[57] ABSTRACT

An impact resistant panel composed of a group of at least three sheets of vitreous material bonded together via intervening layers of plastic material. According to one form of construction, the group includes a set of consecutive vitreous sheets of at least three different thicknesses which are arranged in order of thickness, and at least the first sheet, taken in the direction from the highest sheet thickness end of the set, is tempered. According to a second form of construction, the group includes a set of consecutive sheets of at least two different thicknesses arranged in order of thickness and at least two of the plastic layers are of different thicknesses and are arranged so that one of the layers having the smallest thickness is nearer the first sheet, taken in the direction from the thickest sheet, than is any other layer.

18 Claims, 6 Drawing Figures

IMPACT RESISTANT PANELS

BACKGROUND OF THE INVENTION

This invention relates to an impact resistant panel composed of a group of at least three sheets of vitreous material bonded together via intervening layers of plastic material.

The term "vitreous material" as here used comprehends glasses and vitrocrystalline materials, the latter being glasses which have been treated in such a way as to cause the formation of one or more crystalline phases therein.

Such panels are resistant to the impact of stones, bullets and other similar projectiles. Such panels are therefore often used to form part of a bulletproof screen in banks and post offices, or to form windows, especially windshields, of aircraft and high speed locomotives. The panels are also resistant to breakage by vandals and may be used in display cases in museums, or to provide transparent barriers in prisons.

Hitherto, such panels have needed to be very thick in order to provide adequate impact resistance.

This has resulted in a very heavy and therefore expensive panel. Heavy panels suffer from the further disadvantage that they require heavy supporting structures or frames, and heavy panels are clearly unsuitable for use in aircraft.

SUMMARY OF THE INVENTION

It is an object of the invention to provide an impact resistant panel which is of reduced thickness, compared to prior art panels, and is of relatively high efficiency.

The object of the present invention is achieved by the provision of an impact resistant panel composed of a group of at least three sheets of vitreous material bonded together via intervening layers of plastic material, wherein the group of vitreous sheets includes a set of consecutive vitreous sheets of at least three different thicknesses which are arranged in order of thickness, and at least the first sheet of this set, in the direction from the highest sheet thickness end of the set has been tempered.

The definition of a "a set of consecutive vitreous sheets of at least three different thicknesses which are arranged in order of thickness" does not preclude the use within the set of two sheets of the same thickness, provided that these vitreous sheets are adjacent vitreous sheets, and provided also that vitreous sheets of at least two other thicknesses are also present in the set. Thus for example, a panel according to the invention might be composed of a set of four sheets of glass arranged in order of thickness, their thicknesses being respectively 9 mm, 5 mm, 5 mm and 2 mm.

It will be appreciated that the thicknesses of sheets of vitreous material referred to are nominal thicknesses and may vary within manufacturing tolerances. The differences in thickness referred to however are considerably greater than anything which could come within the scope of normal tolerances encountered in the manufacture of sheets of vitreous material of a given thickness.

The expression "intervening layers" as used herein denotes layers which are each bonded to two vitreous sheets. It is not essential that such an intervening layer be of homogeneous composition. On the contrary, any such intervening layer may be of composite form composed of for example two or more sub-strata.

The sheets of vitreous material constituting the panel may be flat or curved, and one or more of the sheets may be of colored material, for example when intended for use as a tinted windshield.

We have found that a panel according to the present invention may be considerably thinner than a panel of the previously known type while presenting the same impact resistance. In particular, when a bullet is shot against the first sheet of such a set, it is heavily deformed and its trajectory modified, so that its penetrating power is reduced. This happens to a greater extent than with a panel of the known type where there is no tempered sheet and which includes a number of sheets each of the same thickness, and of the same total thickness as a panel according to this invention.

In preferred embodiments of the invention, at least two of the intervening layers of plastic material which bond the sheets of the set together are of different thicknesses and are arranged so that the thinner or the thinnest of them is nearer to the first sheet than is the other such layer or layers.

By disposing the layers of different materials in the panel in this way the materials are used at their optimum. While it is recognized that a layer of plastic material will not afford high impact resistance for a projectile such as a bullet, nor will a sheet of glass, unless it is given a very great thickness, we have found that a structure according to the invention insures that a maximum energy of the projectile is absorbed at the very beginning of its trajectory through the panel, while the remaining energy is best absorbed in the plastic material by deformation in both the elastic and plastic modes. The result is that the distance along which the energy is absorbed can be made relatively short, which reduces the required thickness of the panel.

This results in an extremely efficient impact resistant panel having low penetrability, combined with lower thickness and lighter weight than has hitherto been possible.

Indeed, the advantages afforded by this feature are so great that in some cases it is not necessary to temper a sheet of the panel, and, for the same total thickness, it is not necessary to have a panel composed of a set of sheets of three different thicknesses, since two such different thicknesses of sheet are adequate for a panel of similar penetrability.

Accordingly, in a second aspect thereof, the present invention provides an impact resistant panel composed of a group of at least three sheets of vitreous material bonded together via intervening layers of plastic material, wherein the group of vitreous sheets includes aa set of consecutive vitreous sheets of at least two different thicknesses which are arranged in order of thickness and at least two of the layers of plastic material which bond the sheets of the set together are of different thicknesses and are arranged so that the thinnest layer is nearer the first sheet of the set, in the direction from the higher sheet thickness end thereof, than is any other such layer.

Another advantage afforded by this second aspect of the invention is that the need for sheets of a third different thickness of vitreous sheet is eliminated, and this simplifies manufacture.

Advantageously a panel according to the second aspect of the invention is further characterized in that at least the first sheet of the set has been tempered, since this further increases the efficiency of such an impact resistant panel.

In addition to the fact that a tempered sheet is more difficult to break than a similar but untempered sheet because of the surface compressive stresses induced therein by the tempering treatment, when such a sheet is broken, it will shatter into a large number of small fragments. Further, shattering of a tempered sheet absorbs large quantities of energy. Because of this shattering, the panel will become opaque, and this feature is also of considerable importance when the panel is used as part of a bulletproof partition, and is equally applicable to embodiments constructed in accordance with the first aspect of the invention. Once a criminal has fired a shot at such a panel, if the thick, tempered sheet is broken, the panel becomes opaque, and any person sheltered by the panel can summon aid or escape without his actions being visible to the attacker.

Preferably at least one intervening layer of plastic material is composed of at least one self-supporting membrane of plastic material. This provides a relatively inexpensive and extremely efficient way of assembling a laminated panel.

In preferred embodiments of the invention, there is a set composed of at least four vitreous sheets and the intervening layers of plastic material adherent to these sheets are of at least three different thicknesses arranged in order of thickness with the or a thinnest of them adherent to the first sheet. This feature further increases the degree of impact resistance which can be achieved by the panel.

In preferred embodiments of the invention, the set includes four vitreous sheets each having a different thickness. The total thickness of the panel, and therefore its weight and the weight of an associated frame, may thereby be reduced as compared with another panel of the same impact resistance which does not have this feature.

Advantageously, the thinnest sheet of the set has a thickness of less than 6 mm, to give optimum safety and weight to the panel. A thickness of between 1.5 mm and 3.2 mm is especially advantageous in this respect.

Advantageously, at least the first sheet of the set has been chemically tempered. Chemical tempering enables greater toughening to be achieved than is possible by thermal tempering, and the weight of the panel may therefore be reduced as compared with a panel of which at least the first sheet has been thermally tempered.

It is especially preferred that each sheet of the set be chemically tempered, so as to further enhance the impact resistance of the panel. In addition, chemical tempering can be performed on thinner sheets than is possible with thermal tempering.

Preferably, the or a thinnest vitreous sheet of the set forms an exterior face of the panel. The thinnest sheet of the set will, in use, be closest to the space to be protected. If this sheet breaks, then fragments thereof may be hurled into the protected space, and it is desirable that any such fragments should be as thin as possible so that they will be more likely to be retained by remaining adherent to the adjacent intervening layer of plastic material. Also should any fragments break away from the panel, it is clear that the lighter they are, the less damage they will do.

Advantageously, the first sheet of the set forms an exterior face of the panel, so that a projectile will first strike the strongest sheet of the set and thus undergo maximum deformation and retardation at its initial impact on the panel.

In some preferred embodiments of the invention however, an exterior face of the panel is formed by a thin vitreous sheet bonded to the first sheet of the set. Such a thin sheet may have a thickness of 1 to 2 mm, and may be tinted, and/or serve to carry electrical resistance heating means in order to keep an aircraft or locomotive windshield free from ice.

Advantageously, an exterior face of the panel is formed by a glazing element held in spaced relation from the last sheet of the set, in the direction sheet thickness end thereof. By this means, should the set of sheets be broken, all the fragments resulting therefrom will be contained. If the projectile breaks the glazing element as well, then substantially all the fragments from the broken set will still be contained, and the only fragments to be hurled into the protected area will be fragments of the glazing element. The glazing element may readily be treated in such a way that fragments resulting from its breakage will be small and blunt.

The glazing element may be entirely of vitreous material, but is preferably a laminated structure composed of at least one vitreous sheet. This feature gives added strength to the glazing element, making it more difficult to break, and also, when it is broken, the element tends to crack or craze, rather than shatter and hurl fragments in various directions.

Preferably, the glazing element is spaced from the last sheet of the set of vitreous sheets by a distance of at least 10 mm, since this has been found to give optimum results.

Preferably, at least one exterior face of the panel is formed by a vitreous sheet which has been chemically tempered. Adoption of this feature improves the weight/impact resistance ratio of the panel.

The intervening layers may be formed of polyvinyl butyral. This material is widely available, and has the great advantage that it does not deteriorate to any marked extent due to aging, particularly when sandwiched between sheets of glass which are opaque to ultra-violet light. The polyvinyl butyral may be of a grade having a moisture content of between 0.1 and 0.6% by weight. This grade of polyvinyl butyral can readily be produced industrially and is therefore relatively cheap; furthermore, it gives satisfactory adhesion to the vitreous sheets, and this increases the impact resistance of the panel.

Preferably, the thickness of each intervening layer of plastic material lies between 0.2 mm and 5.0 mm. Layers of this range of thickness, particularly if of polyvinyl butyral, enable sufficient impact resistance to be achieved without unnecessarily increasing the cost of the panel.

A panel according to the invention should be installed so that the sheets of the set decrease in thickness from the side of the panel more prone to damage, i.e., so that the or a thickest sheet of the set is located on that side of the set at which impact is most likely to be directed so that the initial impact of a projectile on the set will be on the thickest and strongest sheet thereof.

A panel according to the invention is very suitable for use as part of a wall of a teller enclosure. For example, such a panel might be used as a transparent partition above a bank or post office counter, or as part of a cage for a teller in a shop or hotel.

Panels according to the invention are also very suitable for use as vehicle windows, for example aircraft and locomotive windshields. Such panels may also be used as windows in security vans of the type used for transporting large sums of money.

DESCRIPTION OF THE PREFERRED EMBODIMENTS

Figure 1:
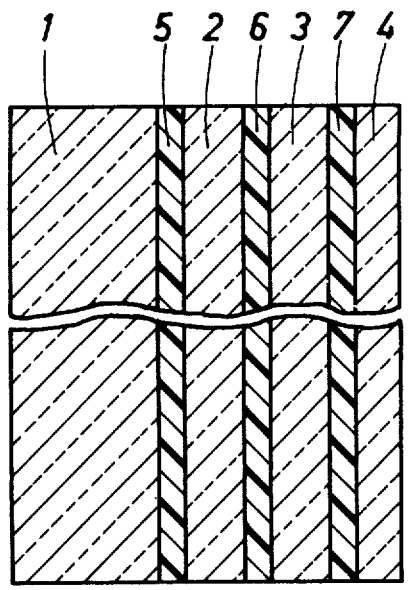
FIG. 1 is a cross-sectional view of an impact resistant panel according to the first aspect of the invention.

The embodiments to be described are ones which have been fabricated and which were subjected to a series of tests employing firearms to verify their ability to resist impacts.

In these tests on impact resistant panels, use was made of three types of weapon:

Weapon I (9 mm GP)

This weapon was a "GP pistol" having a barrel length of 125 mm. The bullets used had a calibre of 9 mm.

Weapon II (.357 magnum)

This weapon is sold under the Trademark "Colt Python" and has four inch (100 mm) barrel. The bullets used were of calibre 0.357 inch (9 mm).

Weapon III (.44 magnum)

This weapon is sold under the Trademark "Ruger Super Blackhawk" and has a 6 inch (150 mm) barrel. The bullets used were of calibre .44 inch (10.6 mm).

The impact resistant panels used as targets in the tests were 30 cm × 30 cm in size.

For each of the samples tested, three shots were fired so that their points of impact were spaced apart by a distance of approximately 10 cm and defined respective apices of an equilateral triangle. Each bullet was fired at a distance of 5 meters from the target panel. The firing angle was 90° to the panel surface.

The quality of each panel tested was assessed on the basis of the number and dispersion of the fragments of the rear sheet of the panel, if broken. To this end, paper 500 mm × 450 mm in size was stretched over a wooden frame fixed 45 cm behind the glazing. Two well-stretched chamois skins were held behind the paper to enable the impact energy and cutting power of any fragments passing through the paper to be assessed by the number and depth of cuts in the skins.

In practice it can be said that a panel has satisfactory impact resistance, for a particular type of weapon if, in the test conditions set forth above, and for the type of weapon envisaged, no fragments of glass pass through the paper as a result of the impact of the bullets on three samples of the panel.

EXAMPLE 1

The panel illustrated in FIG. 1 is an impact resistant panel made up of a set of four sheets 1, 2, 3 and 4 of transparent glass bonded to one another by intervening layers 5, 6 and 7 of polyvinyl butyral.

The transparent sheets 1, 2, 3 and 4 are each made of soda-lime glass of ordinary composition (72 % $SiO_2$; 12.5 % $Na_2O$; 0.09 % $K_2O$; 9.4 % CaO; 3 % MgO; 3 % $Al_2O_3$; 0.01 % $Fe_2O_3$, by weight) and have thicknesses of 9, 5, 5 and 2 mm, respectively. The first vitreous sheet 1 of the set, taken in the direction from the highest sheet thickness end thereof, is thermally tempered.

The polyvinyl butyral intervening layers 5, 6 and 7 each have a thickness of 0.76 mm and the polyvinyl butyral has a moisture content 0.4%, by weight.

A comparison was made between the panel shown in FIG. 1 and another, reference, panel (not shown) of symmetrical structure and made up of three sheets of glass of ordinary composition, such as that set forth above. The sheets were each 7 millimeters thick and were glued together via intervening layers each 0.76 mm in thickness of polyvinyl butyral having a moisture content of 0.4% by weight. The panel according to the invention and the reference panel therefore had equal total thicknesses of glass.

To assess the quality of the two panels, use was made of weapon I, the 9 mm calibre GP weapon, under the conditions set forth above. The first sheet 1 of the panel according to the invention was fired upon. It was found that the first chamois skin disposed behind the panel according to the invention was neither notched nor cut. In contrast, it was found that after the test in the case of the reference panel the two skins were considerably cut. The panel according to the invention, which was of asymmetrical structure, therefore clearly offered greater safety than the reference panel of symmetrical structure.

Moreover an examination of the paper sheets disposed behind the tested panels showed that the dispersion of the fragments of glass, i.e., the area affected thereby, was twice as large in the case of the reference panel as in the case the panel according to the invention.

EXAMPLE 2

Figure 2:
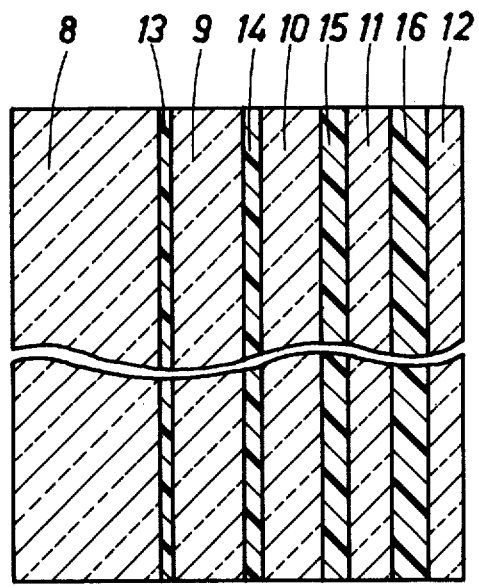
FIG. 2 is a similar view of another embodiment of impact resistant panel according to the invention.

The panel illustrated in FIG. 2 is a panel made up of five sheets of glass 8, 9, 10, 11 and 12 of ordinary composition such as that disclosed in Example 1, and bonded to one another by polyvinyl butyral intervening layers 13, 14, 15 and 16.

The sheets 8, 9, 10, 11 and 12 have thicknesses of 10, 5, 4, 3 and 2 mm, respectively, while the intervening polyvinyl butyral layers 13, 14, 15 and 16 have thicknesses of 0.38 mm, 0.76 mm, 1.52 mm and 2.28 mm, respectively.

In this Example a chemical tempering treatment was performed by immersing each of the vitreous sheets in a bath of molten potassium nitrate at 480°C. During the treatment sodium ions contained in the surface layers of the sheet were replaced by potassium ion contained in the bath of molten potassium nitrate. Since the ionic diameter of potassium is greater than the ionic diameter of sodium, the result of the treatment was to produce compressive stresses in the surface layers of each sheet in equilibrium with tensile stresses set up in the center of the sheet.

To assess the quality of the panel, use was made of weapon II, the 9 mm. 357 magnum weapon, under the conditions set forth above. The sheet 8 was fired upon.

The last sheet 12 of the set of sheets remained intact after the firing tests.

EXAMPLE 3

Figure 3:
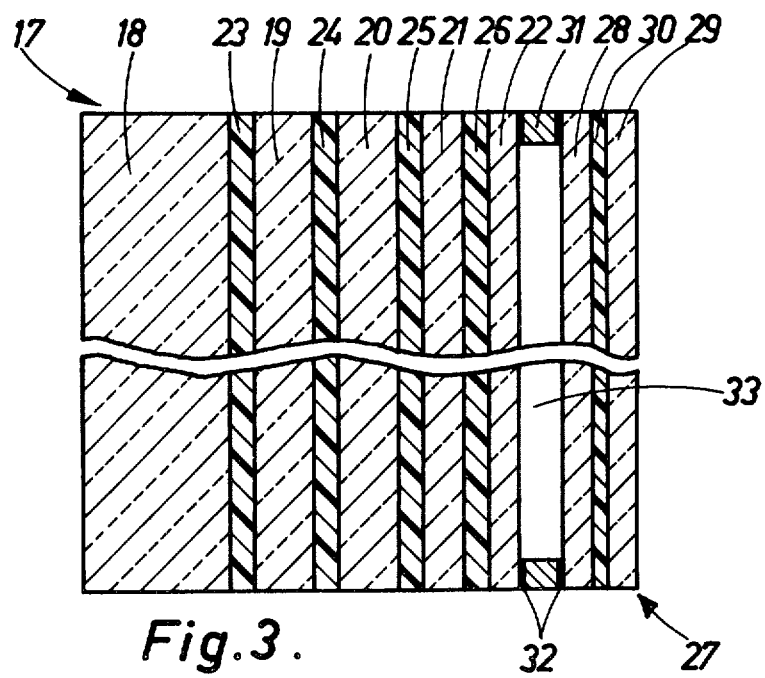
FIG. 3 is a similar view of a panel according to the first aspect of the invention and incorporating a glazing element spaced from the set of vitreous sheets of different thicknesses.

The panel illustrated in FIG. 3 is another type of impact resistant panel according to the invention and is composed of a set 17 made up of sheets 18, 19, 20, 21 and 22 of glass of ordinary composition, such as that set forth above, and bonded to one another by means of intervening layers 23, 24, 25 and 26 of polyvinyl butyral.

The sheets of glass 18, 19, 20, 21 and 22 were each thermally tempered by a conventional process and have thicknesses of 10, 5, 5, 4 and 3 mm, respectively, while the intervening layers 23, 24, 25 and 26 each have a thickness of 0.38 mm, the polyvinyl butyral having an approximate moisture content of 0.3%.

A glazing element 27 composed of two sheets 28 and 29 of ordinary glass, each 1½ millimeters in thickness and connected to one another by a polyvinyl butyral layer 30 having a thickness of 0.2 mm is held spaced 10 mm away from the set 17 of sheets 18 – 22 by an aluminum spacer member 31 glued by adhesive layers 32.

The intermediate space 33 is filled with dehydrated air so as to prevent any subsequent condensation. The sheets of glass 28 and 29 of the glazing element 27 were chemically tempered before assembly by the process described in Example 2.

In this Example, a set 17 of sheets 18 – 22 on its own was compared with the bulletproof glazing illustrated in FIG. 3, the sheet 18 being fired upon in each case.

To assess the quality of the set 17 of sheets, by itself, in comparison with that of the complete panel as illustrated in FIG. 3 and described above, use was made of weapon III, the 10.6 mm calibre 0.44 magnum weapon.

It was found that in the case of the set 17 on its own, all the sheets of glass were broken and the last sheet 22 was deformed. Fragments of glass which were hurled from this last sheet caused a number of tears in sheets of paper stretched behind the assembly tested.

In contrast, in the case of the completed panel unit of the type shown in FIG. 3, it was found that although the set 17 of sheets had also been broken by the bullets, and the last sheet 22 was deformed as before, the glazing element 27 remained unbroken and retained all the fragments of the glass.

EXAMPLE 4

An impact resistant panel as illustrated in FIG. 1 and in every way similar to that described in Example 1 was produced, except that sheets of vitrocrystalline material were substituted for the sheets 1, 2, 3 4. The sheets of vitrocrystalline material had the following composition by weight: $SiO_2 = 48\%$; $Al_2O_3 = 32\%$; $Na_2O = 10\%$; $CaO = 2\%$; $TiO_2 = 8\%$.

This impact resistant panel had a very high efficiency and resistance to scratching.

EXAMPLE 5

An impact resistant panel as shown in FIG. 1 was made. The sheets 1, 2, 3 and 4 were of colored glass. The colored glass was a soda-lime glass of ordinary composition into which 0.15% of $Fe_2O_3$ had been introduced.

The panel had a very high efficiency and resistance to scratching.

EXAMPLE 6

Figure 4:
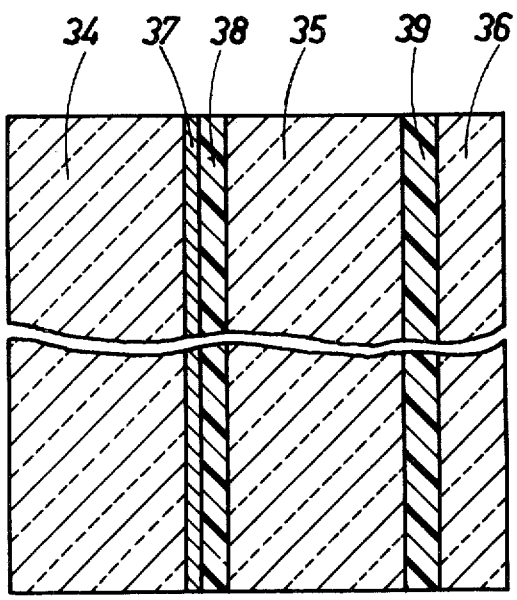
FIG. 4 is a similar view of one embodiment of a panel according to the second aspect of the invention.

FIG. 4 shows an impact resistant panel according to the second aspect of the invention suitable for use as a flat locomotive windshield.

The windshield is composed of three sheets 34, 35 and 36, having thicknesses of 7 mm, 7 mm and 3 mm, respectively, of ordinary soda-lime glass whose composition is set forth in Example 1. Each sheet was given a chemical tempering treatment as described in Example 2.

The sheet 34 is coated with a thin electrically conductive coating 37 to allow heating and defrosting of the windshield. This coating was formed by a deposit of gold obtained by the well-known vacuum evaporation technique. The coating 37 is heated by Joule effect. Electrodes supplying electric current to the coating 37 are not shown.

The three glass sheets are bonded to one another via intervening polyvinyl butyral layers 38 and 39 having thicknesses of 1.52 mm and 2.28 mm, respectively.

The locomotive windshield was not tested by firing bullets at it, but by orienting it as though the sheet 34 formed the outer sheet of a locomotive windshield and was at an angle of 30° to the vertical. For the tests, use was made of a steel cube weighing two kilograms. It was found that the cube could be hurled horizontally at the windshield at a speed of 250 kilometers per hour without passing through the windshield.

EXAMPLE 7

Figure 5:
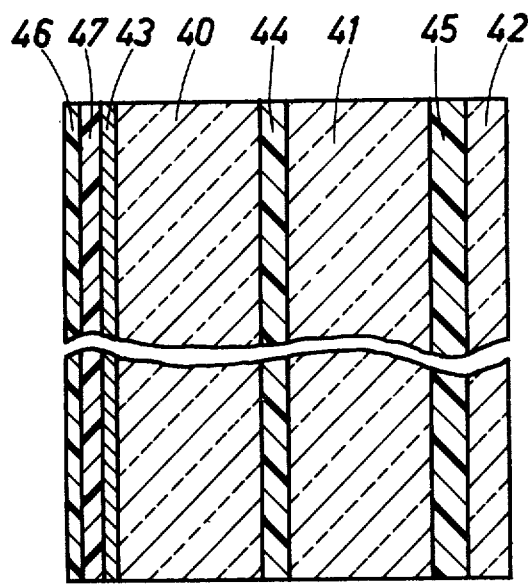
FIG. 5 is a similar view of a second embodiment according to this second aspect.

FIG. 5 shows an impact resistant panel suitable for use as an aircraft windshield.

The windshield is composed of three vitreous sheets 40, 41 and 42, having thicknesses of 7 mm, 7 mm and 3 mm, respectively, of ordinary soda-lime glass whose composition is set forth in Example 1. The sheets were given a chemical tempering treatment as described in Example 2.

In order to allow defrosting of the windshield, the first sheet 40 is covered with a thin electrically conductive coating 43 of gold deposited by the well-known vacuum evaporation technique. The coating 43 is heated by Joule effect. FIG. 5 does not show the electrodes supplying electric current to the coating 43.

The three sheets 40, 41 and 42 were bonded to one another via intervening polyvinyl butyral layers 44 and 45 having thicknesses of 1.52 mm and 2.28 mm, respectively.

To protect the coating of gold 43, a sheet 46 of polycarbonate 3 mm in thickness was bonded to the layer 43 via a polyvinyl butyral layer 47 having a thickness of 0.76 mm.

The aircraft windshield was tested by holding it at an angle of 30° to the vertical and hurling, at the polycarbonate sheet 46, a brick of alumina-based refractory material 1 kg in weight.

It was determined that the brick could be hurled horizontally at the windshield at a speed of 350 km per hour without passing through the windshield.

EXAMPLE 8

An aircraft windshield similar to that described in Example 7 was made.

The special feature of the windshield of this Example was that the conductive coating 43 was not deposited on the first sheet 40 of the set, but on a sheet of polycarbonate 1 mm in thickness. The sheet of polycarbonate, with its conductive coating was bonded to the first sheet 40 of the set via the conductive coating and a layer of polyvinyl butyral. In other words, this coated polycarbonate sheet took place of the sheet 46 in the preceding Example and the coating deposited on the polycarbonate sheet was protected thereby.

EXAMPLE 9

Figure 6:
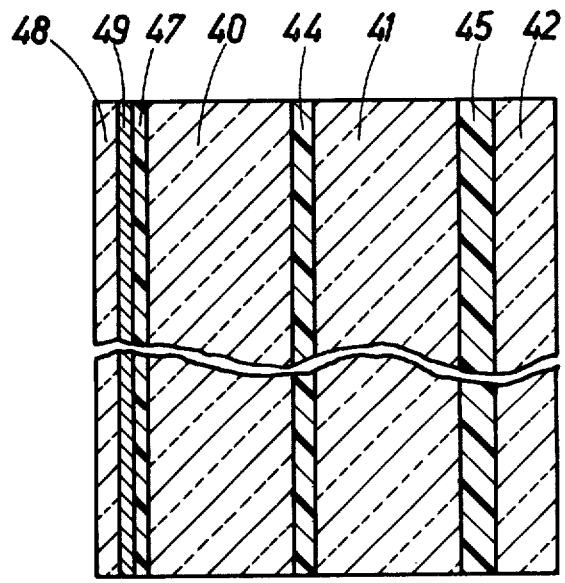
FIG. 6 is a similar view of a third embodiment according to this second aspect.

Another aircraft windshield was made as illustrated in FIG. 6. In Example 9, parts identical to those of Example 7 have identical reference numerals.

The windshield illustrated in FIG. 6 is characterized in that there is bonded to the first sheet 40, which is on the outside of the aircraft, a sheet 48 of ordinary glass 1.2 mm in thickness which has been given a chemical tempering treatment as described in Example 2. The sheet 48 is coated with an electrically conductive coating 49 adapted to defrost the windshield. This coating is protected by the sheet 48.

The invention is not limited to the Examples given above. It would not be departing from the scope of the invention to select other compositions for the sheets of glass or vitrocrystalline material. Such other compositions of glass include, inter alia, aluminosilicates and borosilicates. Other compositions of vitrocrystalline material include, inter alia, lithium glasses or glasses containing nucleating cores, such as gold or selenium, which have been given a thermal treatment adapted to lead to the formation of one or more crystalline phases in the glass.

As described above, the vitreous sheets of different thicknesses are connected to one another by intervening layers of plastic material so as to form a laminated structure. The intervening layers can be composed of a material such as polyvinyl butyral. However, the invention is not limited to the use of polyvinyl butyral, and other materials, including, inter alia, polyurethanes, can be used to form such intervening layers.

Other chemical tempering treatments can be used to reinforce one or more of the sheets of vitreous material of a panel according to the invention.

Such other treatments include the exchange of akali ions contained in the surface zones of the sheets for other alkali ions which may be of larger or smaller diameter, for example, under suitable temperature conditions, potassium ions in the vitreous material may be replaced by lithium ions from a treatment medium.

Lastly, the thicknesses of the vitreous sheets and intervening layers of plastic material producing the laminated panel structure can be modified. Such modification can of course only be made on condition that the required order of thickness of the sheets is maintained in conformity with the invention.

When the impact-resistant panels are intended to be used in special cases, they can be given other properties, for instance anti-heating properties, in which case one or more thin coatings adapted to reflect or absorb infrared radiation are incorporated therein. The panels can also be heating and/or anti-misting panels, can include an anti-theft alarm system, incorporate an aerial, be of variable visible light transmission or reflection, etc.

Lastly, an increased number of vitreous sheets can be used in the impact resistant panel without exceeding the scope of the invention in cases in which there is a risk that objects may be hurled at the panels with very high energy.

It will be understood that the above description of the present invention is susceptible to various modifications, changes and adaptations, and the same are intended to be comprehended within the meaning and range of equivalents of the appended claims.

We claim:

1. In an impact resistant panel composed of a group of at least three sheets of vitreous material bonded together via intervening layers of plastic material, the improvement wherein said group of vitreous sheets comprises a set of consecutive vitreous sheets of at least three different thicknesses which are arranged in order of thickness, and at least the first sheet of said set, taken in the direction from the highest sheet thickness end of said set, is tempered, and at least two of said intervening layers of plastic material are of respectively different thicknesses and are arranged so that the thinner of said layers is nearer to said first sheet than is any other one of said layers.

2. A panel as defined in claim 1 wherein at least one said intervening layer of plastic material comprises at least one self-sustaining membrane of plastic material.

3. A panel as defined in claim 1 wherein there are at least four of said vitreous sheets and said intervening layers of plastic material adherent to said sheets are of at least three different thicknesses arranged in order of thickness, with a layer of least thickness being adherent to said first sheet.

4. A panel as defined in claim 1 wherein there are four of said vitreous sheets each having a respectively different thickness.

5. A panel as defined in claim 1 wherein the thinnest sheet of said set has a thickness of less than 6 mm.

6. A panel as defined in claim 5 wherein said thinnest sheet has a thickness of between 1.5 and 3.2 mm.

7. A panel as defined in claim 1 wherein at least said first sheet of the set is chemically tempered.

8. A panel as defined in claim 7 wherein each said sheet is chemically tempered.

9. A panel as defined in claim 1 wherein a said sheet having the least thickness forms an exterior face of said panel.

10. A panel as defined in claim 1 wherein said first sheet of said set forms an exterior face of the panel.

11. A panel as defined in claim 1 further comprising a glazing element held in spaced relation from the last sheet of said set taken in the direction from the highest sheet thickness end thereof and constituting an exterior face of said panel.

12. A panel as defined in claim 11 where said glazing element is a laminated structure comprising at least one vitreous sheet.

13. A panel as defined in claim 11 wherein said glazing element is spaced from said last sheet of the set of vitreous sheets by a distance of at least 10 mm.

14. A panel as defined in claim 1 wherein at least one exterior face of the panel is formed by a vitreous sheet which is chemically tempered.

15. A panel as defined in claim 1 wherein the thickness of each said intervening layer of plastic material lies between 0.2 and 5.0 mm.

16. A panel as defined in claim 1 and installed so that said sheet of greatest thickness is located on that side of said set against which impact is most likely to be directed.

17. A panel as defined in claim 16 forming part of a wall of a teller enclosure.

18. A panel as defined in claim 16 constituted as a vehicle window.

\* \* \* \* \*